(12) United States Patent
Boyd et al.

(10) Patent No.: US 6,456,797 B1
(45) Date of Patent: Sep. 24, 2002

(54) ELECTRONIC FLASH UNIT WITH ALTERNATIVE CAPACITOR SWITCHING

(75) Inventors: James D. Boyd, Rochester; Michael P. Cramer, Victor; Stephen J. Smith, Shortsville; Roger A. Fields, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 157 days.

(21) Appl. No.: 09/592,634

(22) Filed: Jun. 13, 2000

(51) Int. Cl.[7] .............................................. G03B 15/03
(52) U.S. Cl. ........................ 396/155; 396/157; 396/205; 315/241 P; 315/241 S
(58) Field of Search ................... 315/241 P, 241 S; 396/157, 155, 158, 205, 206

(56) References Cited

U.S. PATENT DOCUMENTS

| | | | |
|---|---|---|---|
| 3,286,128 A | * | 11/1966 | Ward ...................... 315/241 P |
| 3,509,806 A | | 5/1970 | Kiper |
| 3,514,669 A | | 5/1970 | Helmuth |
| 3,650,189 A | | 3/1972 | Biber |
| 3,709,123 A | * | 1/1973 | Tokutomi ................... 396/157 |
| 3,836,924 A | * | 9/1974 | Kawasaki ................... 396/157 |
| 4,174,165 A | * | 11/1979 | Hohda et al. ................ 396/155 |
| 4,717,861 A | | 1/1988 | Yuasa et al. |
| 4,908,552 A | | 3/1990 | Kumakura |
| 5,486,887 A | | 1/1996 | Omiya |
| 5,565,955 A | | 10/1996 | Soshi et al. |
| 5,640,624 A | | 6/1997 | Lee |
| 6,011,359 A | * | 1/2000 | Days ...................... 315/241 S |
| 6,047,138 A | | 4/2000 | Teremy |

* cited by examiner

Primary Examiner—Russell Adams
Assistant Examiner—Michelle Nguyen
(74) Attorney, Agent, or Firm—Roger A. Fields

(57) ABSTRACT

An electronic flash unit has alternative (dual) capacitor switching to reduce flash ready time for flash firing.

3 Claims, 5 Drawing Sheets

US 6,456,797 B1

ELECTRONIC FLASH UNIT WITH ALTERNATIVE CAPACITOR SWITCHING

FIELD OF THE INVENTION

The invention relates generally to the field of photography, and in particular to electronic flash units for use in cameras. More specifically, the invention relates to an electronic flash unit with alternative (dual) capacitor switching to reduce flash ready time.

BACKGROUND OF THE INVENTION

Electronic flash, as used in photography, is produced by an instantaneous electric discharge between two (anode and cathode) electrodes in a gas-filled glass tube. In practice, the electrical energy for the discharge is stored in a capacitor. The main components of an electronic flash unit are therefore the power supply, the capacitor, the triggering circuit, and the flash tube itself usually with a reflector.

At present, electronic flash units are built into a broad spectrum of cameras, from disposable one-time-use cameras to sophisticated single-lens reflex cameras. Typically, they use a high-frequency oscillator to convert the dc voltage from a battery to an ac voltage that's stepped up in a transformer. This high voltage is rectified back to dc and stored in a flash (main) capacitor connected to a flash tube filled with xenon and small amounts of other gases. A monitoring circuit ignites a flash ready light when the stored voltage in the flash capacitor approaches a peak capacity. The stored voltage cannot discharge through the flash tube until the xenon becomes ionized. This happens when the camera's shutter-flash synchronization switch closes, dumping the charge from a small trigger capacitor into an ignition coil connected to the flash tube, which produces a brief burst of voltage applied to the glass wall of the flash tube via a third (triggering) electrode. The xenon is then ionized to provide a conductive path for the stored voltage from the flash capacitor.

Since the electronic flash unit usually has only one flash capacitor, flash ready time is limited by the time it takes to recharge the flash capacitor to its storage capacity following each flash illumination. Prior art U.S. Pat. No. 5,640,624 issued Jun. 17, 1997 discloses a high-speed flash charging system that accelerates flash charging time. The flash charging system includes an energy charging section with three capacitors and a trigger section with two capacitors for energizing the flash tube. The three capacitors are successively discharged as needed to charge the two capacitors.

SUMMARY OF THE INVENTION

An electronic flash unit comprising:
a flash tube;
first and second energy-storing flash capacitors, each one having an identical storage capacity which is sufficient to energize the flash tube for the same amount of flash illumination when either one of the first and second capacitors discharges its stored energy through the flash tube; and
a controller alternatively connecting the first and second capacitors to the flash tube to permit each one of the first and second capacitors to individually discharge its stored energy through the flash tube.

Preferably, a flash charging circuit charges each one of the first and second capacitors to their identical storage capacity, and the controller connects the flash charging circuit to the first capacitor when the first capacitor has discharged its stored energy through the flash tube and connects the flash charging circuit to the second capacitor when the second capacitor has discharged its stored energy through the flash tube.

DETAILED DESCRIPTION OF THE INVENTION

The invention is disclosed as being embodied preferably in a one-time-use camera with a built-in electronic flash unit. Because the features of a one-time-use camera with a built-in electronic flash unit are generally known, the description which follows is directed in particular only to those elements forming part of or cooperating directly with the disclosed embodiment. It is to be understood, however, that other elements may take various forms known to a person of ordinary skill in the art.

Figure 1:
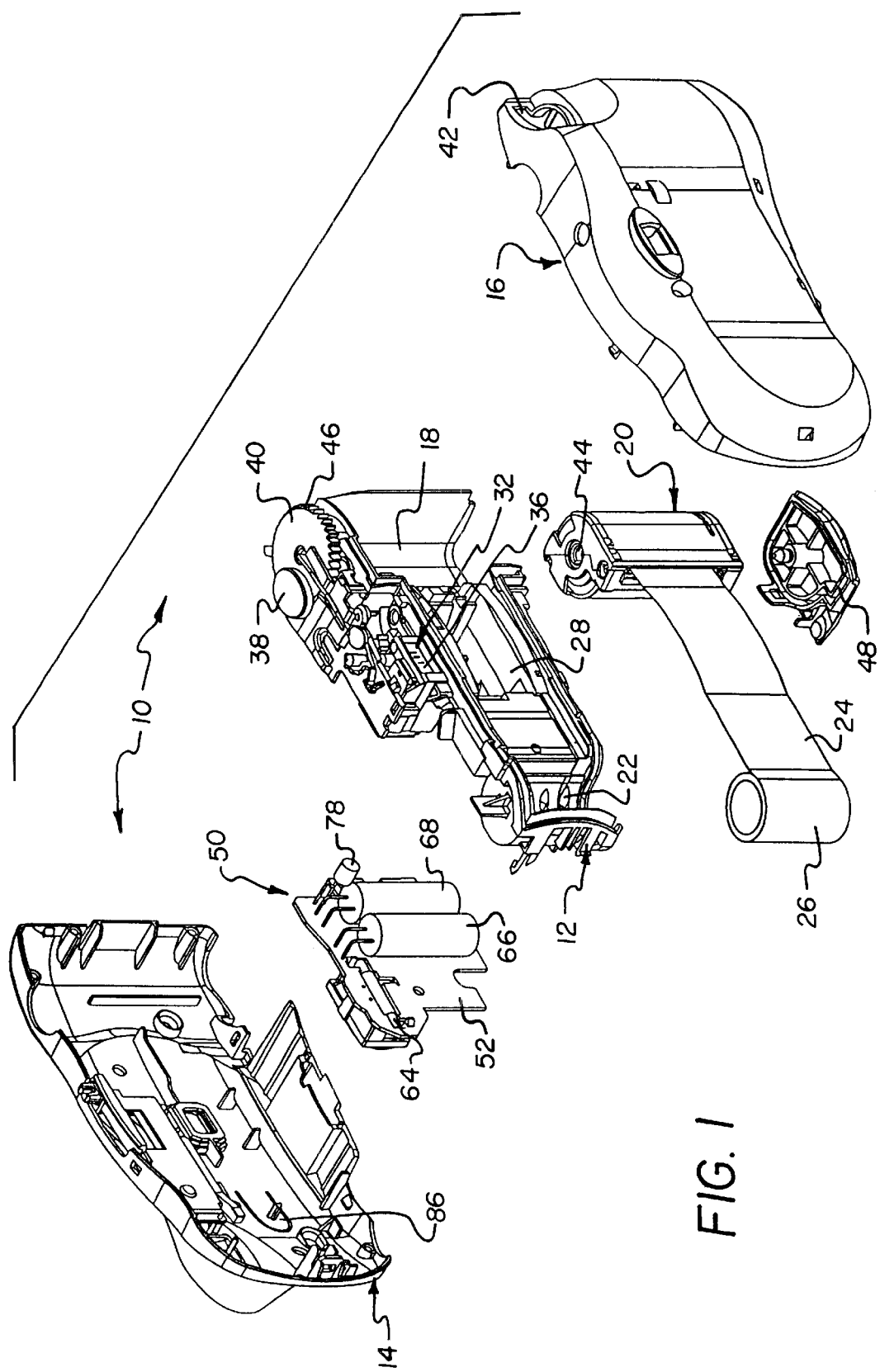
FIG. 1 is an exploded rear perspective view of a one-time-use camera with a built-in electronic flash unit according to a preferred embodiment of the invention.
Figure 2:
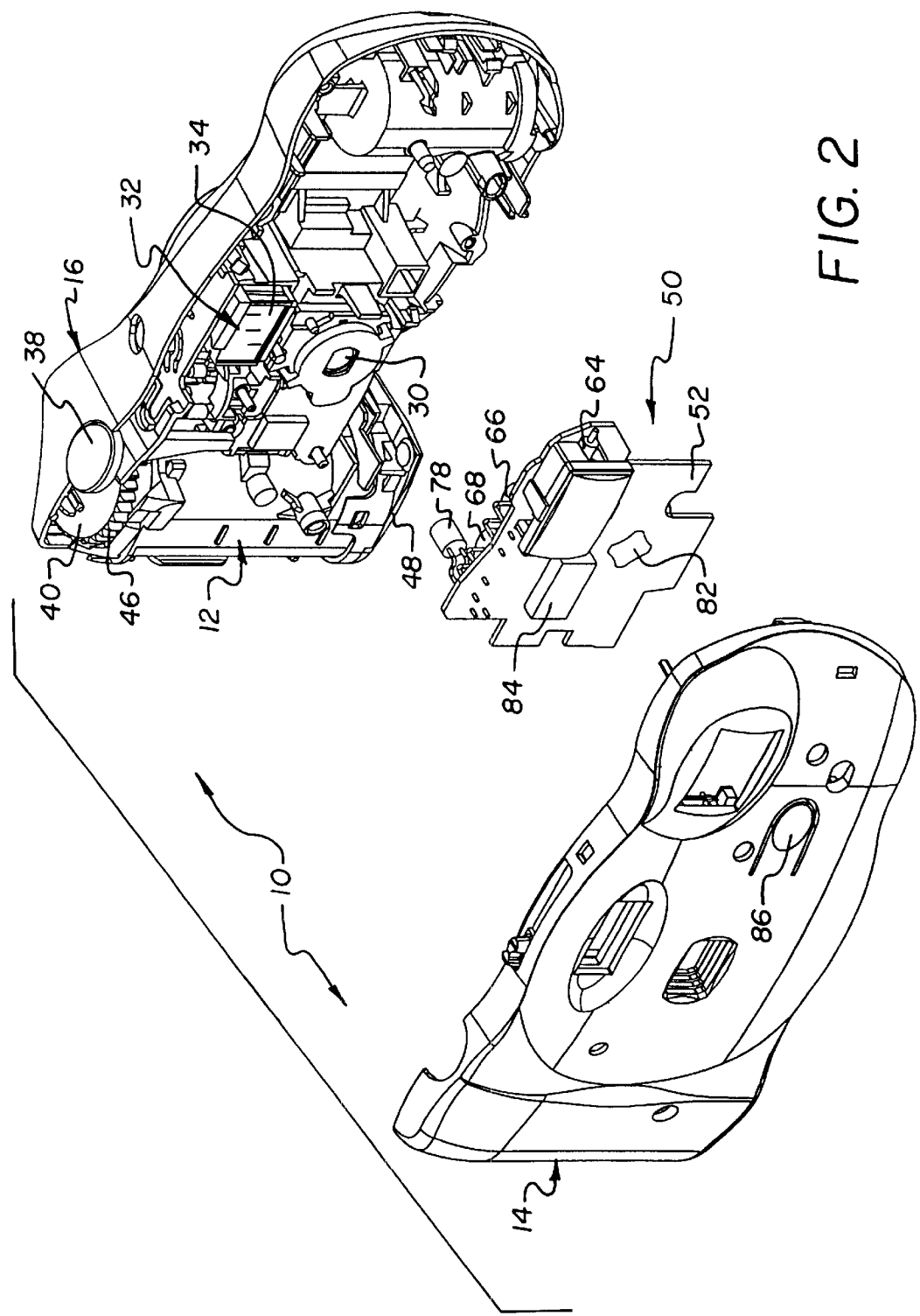
FIG. 2 is a partially-exploded, partially-assembled front perspective view of the camera shown in FIG. 1.

Referring now to the drawings, FIGS. 1 and 2 show one-time-use camera 10 including a plastic opaque main body part 12, a plastic opaque front cover part 14, and a plastic opaque rear cover part 16. The front cover part 14 and the rear cover part 16 house the main body part 12 between them and are connected releasably to one another and to the main body part 12 via known hook-in-hole connections.

As is typical, the main body part 12 has a rearwardly open cartridge receiving chamber 18 for a conventional film cartridge 20 and a rearwardly open film supply chamber 22. See FIGS. 1 and 2. During manufacture, a filmstrip 24 is prewound from the film cartridge 20 into an unexposed film roll 26 which is placed in the film supply chamber 22. A rearwardly open backframe opening 28 is located between the cartridge receiving chamber 18 and the film supply chamber 22 for exposing successive frames of the filmstrip 24 when ambient light is received through a front taking lens 30 on the main body part 12.

A known optical viewfinder 32 has a pair of front and rear viewfinder lenses 34 and 36 for viewing a subject to be photographed, and supports a shutter release button 38 that is manually depressed to initiate momentary shutter-opening.

A film winding thumbwheel 40, rotatably supported on the main body part 12, above the cartridge receiving chamber 18, radially protrudes partially from an elongate narrow opening 42 in the rear cover part 16 and has a depending coaxial stem, not shown, in coaxial engagement with an exposed top end 44 of a film take-up spool inside the film cartridge 20. The film winding thumbwheel 40 has a continuous alternating series of peripheral-edge symmetrical teeth 46 that readily permit the thumbwheel to be manually grasped or fingered to incrementally rotate the thumbwheel in a film winding direction, i.e. counterclockwise in FIGS. 1 and 2, to similarly rotate the film take-up spool inside the film cartridge 20. This is done in order to wind an exposed frame of the filmstrip 24 from the backframe opening 28 into the film cartridge 20 after each film exposure, and to move a fresh frame of the filmstrip from the unexposed film roll 26 to the backframe opening. Each time the filmstrip 24 is advanced slightly greater than a frame width, A metering lever or other device, not shown engages one of the teeth 46 to prevent rotation of the thumbwheel 40.

When the filmstrip 24 is wound completely into the film cartridge 20, a bottom cover-door 48 for the cartridge receiving chamber 18 is disengaged from the main body part 12 to permit the film cartridge to be removed from the cartridge receiving chamber.

Figure 3:
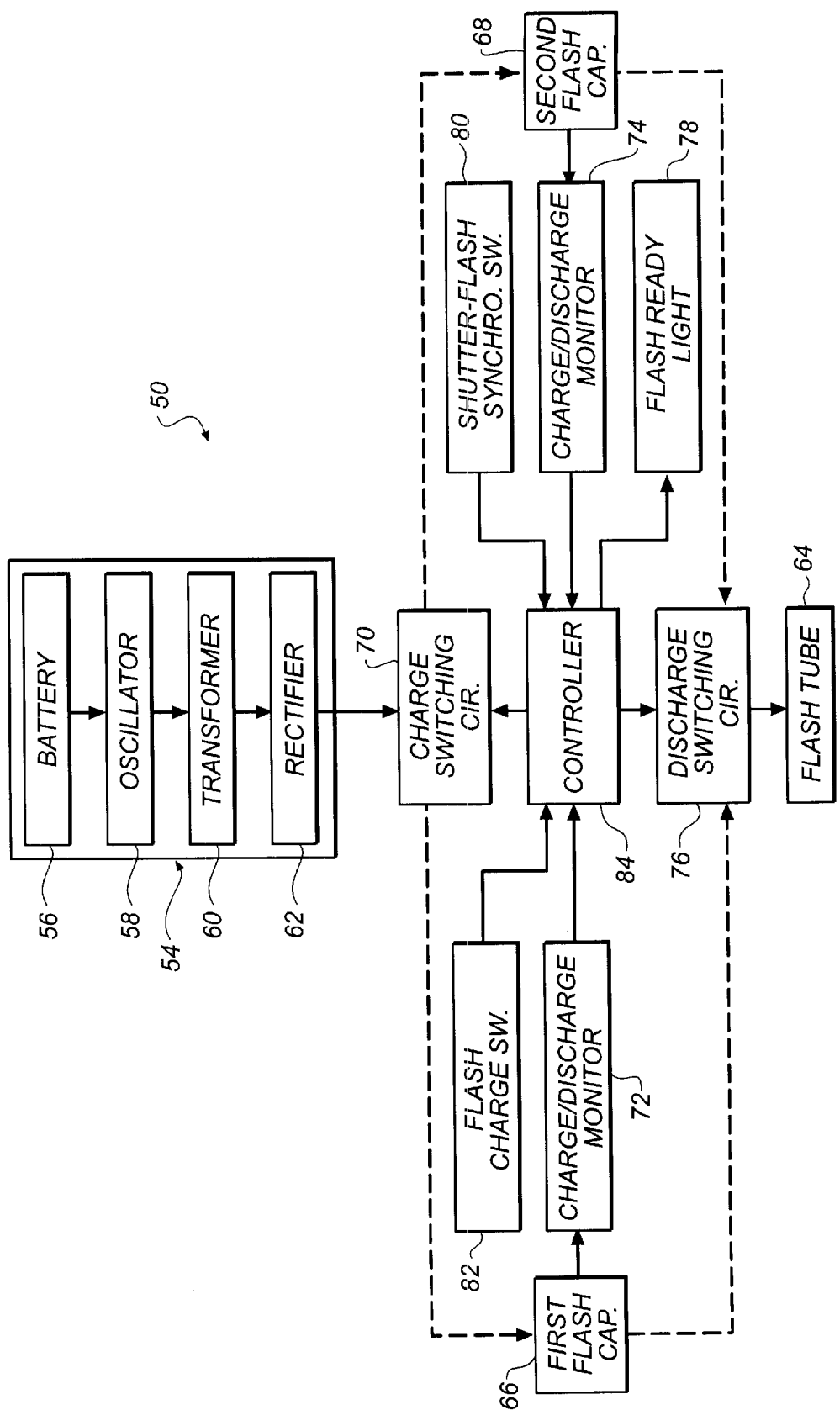
FIG. 3 is a schematic diagram of the electronic flash unit.

As shown collectively in FIGS. 1–3, an electronic flash unit 50 on the main body part 12 has a flash circuit board 52 on which is included the following components.

(a) A conventional flash charging circuit 54 including a battery 56, a high-frequency oscillator 58, a transformer 60 and a rectifier 62. The high-frequency oscillator 58 converts the dc voltage from the battery 56 to an ac voltage that's stepped up in the transformer 60. The rectifier 62 then rectifies the high voltage back to dc.

(b) A conventional glass-walled flash tube 64 filled with xenon and small amounts of the gases.

(c) First and second conventional energy-storing flash (main) capacitors 66 and 68, each one having an identical storage capacity which is sufficient to energize the flash tube 64 for the same amount of flash illumination when either one of the first and second capacitors discharges its stored energy through the flash tube.

(d) A known-type charge switching circuit 70 having mutually exclusive first and second states to alternatively connect each one of the first and second flash capacitors 66 and 68 to the flash charging circuit 54, for the flash charging circuit to charge whichever one of the flash capacitors that is connected to the flash charging circuit to its storage capacity. Only one of the first and second flash capacitors 66 and 68 can be connected to the flash charging circuit 54 at a time. The charge switching circuit 70, when not being used, is biased to a neutral (or third) state intermediate the first and second states in which neither one of the first and second flash capacitors 66 and 68 is connected to the flash charging circuit 54.

(e) Respective known-type charge/discharge monitors 72 and 74 that determine the individual charge-state, i.e. charged or discharged, of the first and second flash capacitors 66 and 68.

(f) A known-type discharge switching circuit 76, similar to the charge switching circuit 70, has mutually exclusive first and second states to alternatively connect each one of the first and second flash capacitors 66 and 68 to the flash tube 64, for whichever one of the flash capacitors that is connected to the flash tube to discharge its stored energy through the flash tube. Only one of the first and second flash capacitors 66 and 68 can be connected to the flash tube 64 at a time. The discharge switching circuit 76, when not being used, is biased to a neutral (third) state intermediate the first and second states in which neither one of the first and second flash capacitors 66 and 68 is connected to the flash tube 64.

(g) A conventional flash ready light 78.

(h) A known-type biased-open shutter-flash synchronization switch 80.

(i) A known-type biased-open flash charge switch 82 which must be closed to initiate flash charging when the camera 10 has not been used for awhile, i.e. the charge switching and discharge switching circuits 70 and 76 are in their respective neutral states.

(j) A known-type controller, such as a microprocessor, 84 for controlling operation of the electronic flash unit 50.

Operation

Figure 4:
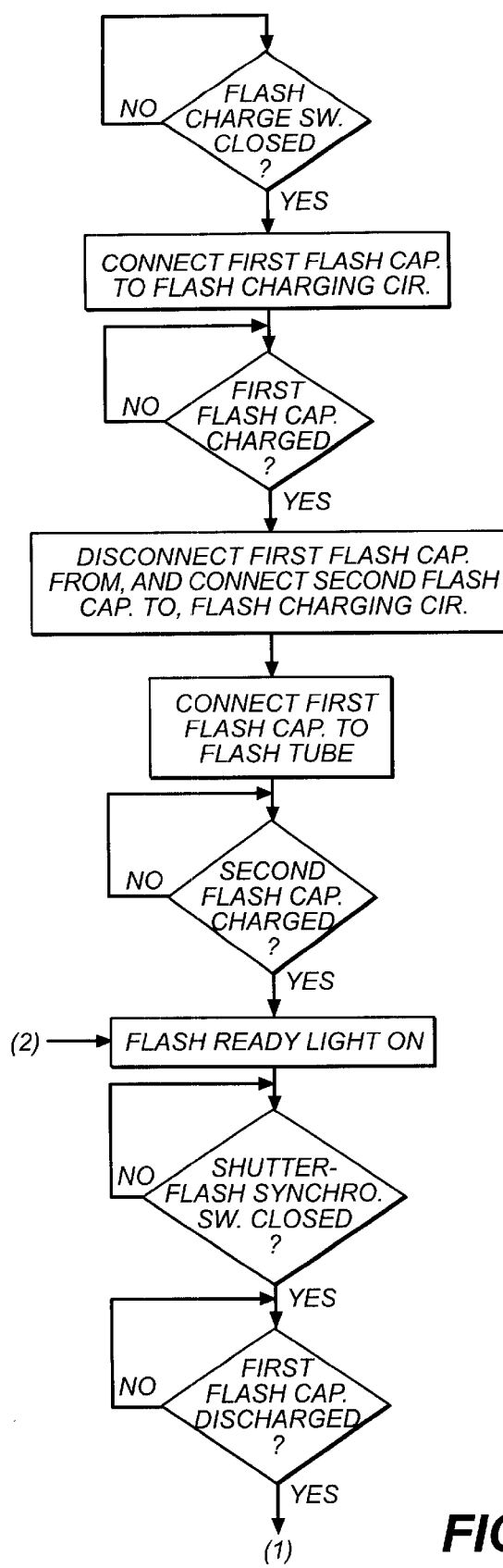
FIGS. 4 and 5 are a flow chart depicting operation of the electronic flash unit.
Figure 5:
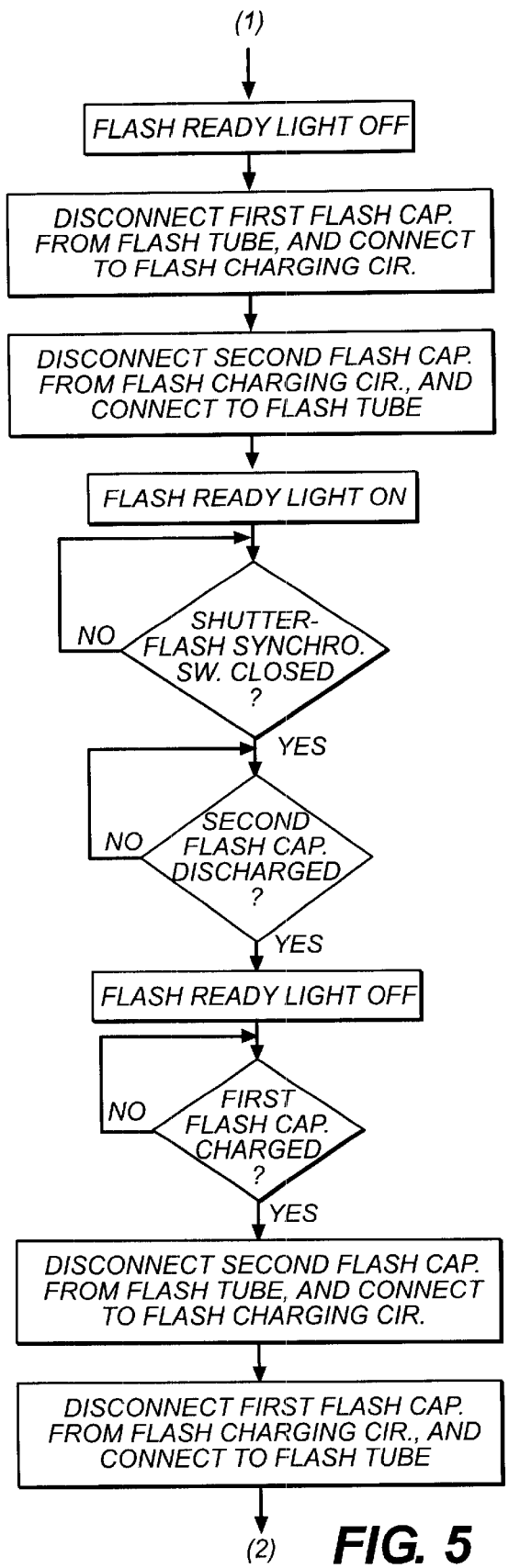

The method of operating the electronic flash unit 50 is shown in FIGS. 4 and 5.

Beginning in FIG. 4, when a flash charge button 86, which is an integral button portion of the front cover part 14, is manually depressed, it closes the flash charge switch 82.

The controller 84, sensing closure of the flash charge switch 82, orders the charge switching circuit 70 to change from its neutral state to its first state in order to connect the first flash capacitor 66 to the flash charging circuit 54.

When the charge/discharge monitor 72 informs the controller 84 that the first flash capacitor 66 is fully charged, the controller orders the charge switching circuit 70 to change from its first state to its second state in order to disconnect the first flash capacitor 66 from the flash charging circuit 54 and alternatively connect the second flash capacitor 68 to the flash charging circuit, and orders the discharge switching circuit 76 to change from its neutral state to its first state in order to connect the first flash capacitor to the flash tube 64.

When the charge/discharge monitor 80 informs the controller 84 that the second flash capacitor 68 is fully charged, the controller 84 turns the flash ready light 78 on.

The camera 10 is now ready for flash use.

When the shutter release button 38 is manually depressed to initiate momentary shutter-opening, the shutter-flash synchronization switch 80 is briefly closed. The controller 84, sensing closure of the shutter-flash synchronization switch 80, orders a conventional trigger circuit (not shown) including a trigger capacitor and an ignition coil to produce a brief burst of voltage applied to the glass wall of the flash tube 64. The xenon in the flash tube 64 is then ionized, which provides a conductive path for the stored voltage in the first flash capacitor 66.

When the charge/discharge monitor 72 informs the controller 84 that the first flash capacitor 66 has discharged its stored voltage through the flash tube 64, the controller turns the flash ready light 78 off, orders the charge switching circuit 70 to change from its second state to its first state in order to disconnect the second flash capacitor 68 from the flash charging circuit 54 and alternatively connect the first flash capacitor 66 to the flash charging circuit, and orders the discharge switching circuit 76 to change from its first state to its second state in order to disconnect the first flash capacitor from the flash tube 64 and alternatively connect the second flash capacitor to the flash tube.

Then, the controller 84 turns the flash ready light 78 on.

If the shutter release button 38 is again depressed to initiate momentary shutter-opening, the shutter-flash synchronization switch 80 is briefly closed. The controller 84, sensing closure of the shutter-flash synchronization switch 80, orders the trigger circuit to produce a brief burst of voltage applied to the glass wall of the flash tube 64. The xenon in the flash tube 64 is then ionized, which provides a conductive path for the stored voltage in the second flash capacitor 68.

When the charge/discharge monitor 74 informs the controller 84 that the second flash capacitor 68 has discharged its stored voltage through the flash tube 64, the controller turns the flash ready light 78 off.

When the charge/discharge monitor 72 informs the controller 84 that the first flash capacitor 66 is fully charged, the controller orders the charge switching circuit 70 to change from its first state to its second state in order to disconnect the first flash capacitor from the flash charging circuit 54 and alternatively connect the second flash capacitor 68 to the flash charging circuit, and orders the discharge switching circuit 76 to change from its second state to its first state in order to change from its second state to its first state in order to disconnect the second flash capacitor from the flash tube 64 and alternatively connect the first flash capacitor to the flash tube.

Then, the controller 84 turns the flash ready light 78 on. See (2) in FIG. 4.

This cycle from (2) in FIG. 4 to (2) in FIG. 5 can then be repeated.

The invention has been described with reference to a preferred embodiment. However, it will be appreciated that variations and modifications can be effected by a person of ordinary skill in the art without departing from the scope of the invention. For example instead of alternatively switching between the two flash capacitors 66 and 68, the electronic flash unit 50 could be expanded to alternatively switch between three or more flash reflectors.

PARTS LIST 10. camera
12. main body part
14. front cover part
16. rear cover part
18. cartridge receiving chamber
20. film cartridge
22. film supply chamber
24. filmstrip
26. unexposed film roll
28. backframe opening
30. front taking lens
32. optical viewfinder
34. front viewfinder lens
36. rear viewfinder lens
38. shutter release button
40. film winding thumbwheel
42. narrow opening
44. top spool end
46. teeth
48. bottom cover-door
50. electronic flash unit
52. flash circuit board
54. flash charging circuit
56. battery
58. oscillator
60. transformer
62. rectifier
64. flash tube
66. first flash capacitor
68. second flash capacitor
70. charge switching circuit
72. charge/discharge monitor
74. charge/discharge monitor
76. discharge switching circuit
78. flash ready light
80. shutter-flash synchronization switch
82. flash charge switch
84. controller
86. flash charge button

What is claimed is:

1. An electronic flash unit comprising:

a flash tube;

first and second energy-storing flash capacitors, each one having an identical storage capacity which is sufficient to energize said flash tube for the same amount of flash illumination when either one of said first and second capacitors discharges its stored energy through said flash tube;

a flash charging circuit charges each one of said first and second capacitors to their identical storage capacity;

a charge switching circuit having mutually exclusive first and second states to alternatively connect each one of said first and second flash capacitors to said flash charging circuit, for the flash charging circuit to charge whichever one of said first and second flash capacitors that is connected to said flash charging circuit to its storage capacity, said charge switching circuit being biased to a neutral third state in which neither one of said first and second flash capacitors is connected to said flash charging circuit; and a controller changes said charge switching circuit to its first state to connect said flash charging circuit to said first capacitor when said first capacitor has discharged its stored energy through said flash tube and changes said charge switching circuit to its second state to connect said flash charging circuit to said second capacitor when said second capacitor has discharged its stored energy through said flash tube.

2. An electronic flash unit comprising:

a flash tube, first and second energy-storing flash capacitors, each one having an identical storage capacity which is sufficient to energize said flash tube for the same amount of flash illumination when either one of said first and second capacitors discharges its stored energy through said flash tube;

a flash charging circuit charges each one of said first and second capacitors to their identical storage capacity;

a charge switching circuit having mutually exclusive first and second states to alternatively connect each one of said first and second flash capacitors to said flash charging circuit, for said flash charging circuit to charge whichever one of said first and second flash capacitors that is connected to said flash charging circuit to its storage capacity, said charge switching circuit being biased to a neutral third state in which neither one of said first and second flash capacitors is connected to said flash charging circuit; and a discharge switching circuit having mutually exclusive first and second states to alternatively connect each one of said first and second flash capacitors to said flash tube, for whichever one of said first and second flash capacitors that is connected to said flash tube to discharge it storage energy through said flash tube, said discharge switching circuit being biased to a neutral third state in which neither one of said first and second flash capacitors is connected to said flash tube.

3. An electronic flash unit as recited in claim 2, further comprising:

a charge/discharge monitor that determines the individual charge state, i.e., charged or discharged, of said first capacitor, and a controller, which when said charge/discharge monitor determines that said first capacitor is fully charged, orders said charge switching circuit to change from its first state to its second state in order to disconnect said first capacitor from said flash charging circuit and to connect said second capacitor to said flash charging circuit, and orders said discharge switching circuit to change from its neutral state to its first state in order to connect said first capacitor to said flash tube, and which, when said charge/discharge monitor determines that said first capacitor has discharged its stored voltage through said flash tube, orders said charge switching circuit to change from its second state to its first state in order to disconnect said second capacitor from said flash charging circuit and connect said first capacitor to said flash charging circuit, and orders said discharge switching circuit to change from its first state to its second state in order to disconnect said first capacitor from said flash tube and connect said second capacitor to said flash tube.

\* \* \* \* \*